United States Patent
Kawamura et al.

(10) Patent No.: US 7,838,592 B2
(45) Date of Patent: Nov. 23, 2010

(54) STARCH-BASED COATING COMPOSITION

(75) Inventors: Chikara Kawamura, Hiratsuka (JP); Kenichi Umezawa, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 752 days.

(21) Appl. No.: 11/808,064

(22) Filed: Jun. 6, 2007

(65) Prior Publication Data

US 2007/0287777 A1 Dec. 13, 2007

(30) Foreign Application Priority Data

Jun. 7, 2006 (JP) .............................. 2006-158054
Dec. 18, 2006 (JP) .............................. 2006-340180

(51) Int. Cl.
*A61K 9/28* (2006.01)
*A61K 47/48* (2006.01)
*C08B 31/00* (2006.01)
*C08B 31/12* (2006.01)
*C08B 37/00* (2006.01)
*C08F 116/06* (2006.01)
*C08F 216/06* (2006.01)
*C08G 18/00* (2006.01)
*C08G 18/08* (2006.01)
*C08G 18/28* (2006.01)
*C08G 18/48* (2006.01)
*C08J 3/00* (2006.01)
*C08K 3/20* (2006.01)
*C08L 3/00* (2006.01)
*C08L 75/00* (2006.01)
*C08L 89/00* (2006.01)
*D21H 19/54* (2006.01)
*D21H 19/58* (2006.01)

(52) U.S. Cl. .............................. 524/590; 524/47; 524/50; 524/51; 524/52; 524/507; 525/54.2; 525/54.21; 525/54.22; 525/54.24; 525/54.26; 525/54.31; 527/301; 527/302; 528/44; 528/77; 528/78; 528/79; 528/85

(58) Field of Classification Search .................. 524/47, 524/52, 507, 590, 50, 51; 525/54.2, 54.21, 525/54.22, 54.24, 54.26, 54.31; 527/301, 527/302; 528/44, 77, 78, 79, 85
See application file for complete search history.

(56) References Cited

U.S. PATENT DOCUMENTS

| 3,405,080 | A | 10/1968 | Otey et al. |
| 3,425,971 | A | 2/1969 | Gugliemelli |
| 3,981,100 | A | 9/1976 | Weaver et al. |
| 4,375,535 | A | 3/1983 | Kightlinger et al. |
| 5,138,006 | A | 8/1992 | Cook et al. |
| 5,280,055 | A | 1/1994 | Tomka et al. |
| 5,714,540 | A | 2/1998 | Tanaka et al. |
| 2004/0152857 | A1 | 8/2004 | Ohnishi et al. |

FOREIGN PATENT DOCUMENTS

| JP | 54-120698 A | 9/1979 |
| JP | 55-090518 A | 7/1980 |
| JP | 05-43649 A | 2/1993 |
| JP | 05-186556 A | 7/1993 |
| JP | 06-065349 A | 3/1994 |
| JP | 2006-052338 A | 2/2006 |

OTHER PUBLICATIONS

Machine English translation of JP 06-065349 Tanaka et al.*
Jett C. Arthur, Jr, Graft Polymerization Onto Polysaccharides, Advances in Macromolecular Chemistry, 1970, pp. 1-86, vol. 2, Academic Press, London and New York.

* cited by examiner

*Primary Examiner*—Patrick D Niland
(74) *Attorney, Agent, or Firm*—Millen, White, Zelano & Branigan, P.C.

(57) ABSTRACT

There is provided a starch-based coating composition with excellent storage stability as a one-pack type paint, which can form coating films with excellent drying property, finished appearances, pencil hardness, mar resistance, adhesion, alkali resistance, solvent resistance and weather resistance, as well as coated articles that have been coated with the starch-based coating composition. The starch-based coating composition comprises as the binder a resin composition obtained by reacting (A) starch and/or modified starch with (B) an isocyanate group-containing compound obtained by reacting a polyisocyanate compound (b1) and a polyhydric alcohol (b2), or by reaction of these components with a resin obtained by radical polymerization of a mixture comprising an aromatic-based radical polymerizing unsaturated monomer, a hydroxyl group-containing radical polymerizing unsaturated monomer and optionally another radical polymerizing unsaturated monomer.

20 Claims, No Drawings

STARCH-BASED COATING COMPOSITION

BACKGROUND OF THE INVENTION

1. Field of the Invention

The present invention relates to a starch-based coating composition. In particular, the invention relates to a starch-based coating composition utilizing starch which is naturally derived and biodegradable, having excellent storage stability as a one-pack type paint, and capable of forming coating films with excellent drying properties, finished appearances, pencil hardness, mar resistance, adhesion, alkali resistance, solvent resistance and weather resistance, as well as to coated articles coated with the starch-based coating composition.

2. Description of Related Art

Recent years have seen an increased demand for active use of naturally derived, biodegradable raw materials with a low environmental load, from the standpoint of minimizing effects on the earth environment by improving waste treatment and lowering $CO_2$ emissions.

Typical naturally derived materials include modified starches such as polysaccharide starches or acetylated starches which have conventionally been used in the food and papermaking industries, but recently such starches have come into use as biodegradable plastic materials in the form of products for a wide range of fields including food containers, packaging materials, buffer material sheets, agricultural films, disposable diapers and the like.

Starch that has been subjected to various types of processing to partially modify its original structure or properties is called "chemically modified starch", and starches have been modified and improved in various ways by chemical modification for utilization as starting materials for industrial products. The basic structure of starch is a mixture of amylose consisting of α-D-glucose linked in a linear fashion by 1,4-bonds and amylopectin with the same in a branched structure, and modifications such as esterification and etherification utilizing the hydroxyl groups in the structure have been employed since the 1960s.

There have also been proposed urethanated starches wherein at least some of the hydroxyl groups of starch or modified starch are urethanated by reaction with isocyanate compounds (see Japanese Unexamined Patent Publication No. 5-43649).

There has further been proposed a process for production of biodegradable polyurethane by reaction of a polyisocyanate with an organic solvent solution containing at least one type of plant component selected from among hydroxyl-containing modified starches or modified starches, molasses, polysaccharide-based agricultural wastes and vegetable oils (see Japanese Unexamined Patent Publication No. 5-186556).

Similarly, bonding of starches and hydroxyl-containing acryl resins with polyisocyanates has also been proposed (see Japanese Unexamined Patent Publication No. 6-65349).

This involves indirect grafting of the "starch resin" and acryl resin via the polyisocyanate, but several publications have also disclosed methods of direct production of graft starches obtained by radical graft polymerization of unsaturated monomers with starches or modified starches (see J. C. Arthur, Jr.; Advan. Macromol. Chem.; "Graft Polymerization onto Polysaccharide"; 2:1-87(1970), U.S. Pat. No. 3,425,971, U.S. Pat. No. 3,981,100, Japanese Unexamined Patent Publication No. 54-120698, Japanese Unexamined Patent Publication No. 55-90518, Japanese Unexamined Patent Publication No. 56-167746, Japanese Unexamined Patent Publication No. 8-239402).

In addition, as examples of combinations of starch with other biodegradable resins, inventions have been disclosed that employ as molding materials different polymer blends comprising combinations of starch or modified starch with cellulose derivatives (see Japanese Unexamined Patent Publication No. 6-207047, Japanese Unexamined Patent Publication No. 8-231762).

As clearly taught in these publications, starch-based resins with combinations of different polymers either bonded or grafted are known. However, all of these conventional techniques assume that the uses of the starch-based resins are for structural materials, injection molding materials, sheets and the like, whereas no uses as paints have been disclosed.

For coating using a starch-based resin, there has been disclosed the use of a reactive curing paint which is a curable starch composition comprising a mixture of a starch-based resin and a curing agent having a functional group that reacts with the multiple hydroxyl groups in the starch molecule (see Japanese Unexamined Patent Publication No. 2004-224887).

There has also been disclosed a water-dispersed resin with a mean particle size of no greater than 1000 nm comprising as a constituent component a copolymer of (A) modified starch and (B) a polymerizable unsaturated monomer, and the use of a water-based coating composition containing the resin, as a reactive curing paint (see Japanese Unexamined Patent Publication No. 2006-52338).

However, this starch-based paint technology of the prior art is concerned with reactive curing paints, whereas a one-pack lacquer type starch-based paint has not yet been developed that exhibits excellent storage stability and is capable of forming a coating film with superior drying property, finished appearances, pencil hardness, mar resistance, adhesion, alkali resistance, solvent resistance and weather resistance.

BRIEF SUMMARY OF THE INVENTION

It is an object of the present invention to provide a starch-based coating composition utilizing starch which is naturally derived and biodegradable, having excellent storage stability as a one-pack type paint, and being capable of forming coating films with excellent drying properties, finished appearances, pencil hardness, mar resistance, adhesion, alkali resistance, solvent resistance and weather resistance, as well as coated articles coated with the starch-based coating composition.

As a result of much diligent research directed toward solving the aforementioned problems of the prior art, the present inventors have discovered that they can be solved by using a starch-based resin composition with a specific composition, and have completed the invention based on this discovery.

Specifically, the invention provides the following.

1. A starch-based coating composition characterized by comprising as the binder a resin composition obtained by reacting (A) starch and/or modified starch with (B) a compound containing an isocyanate group obtained by reacting a polyisocyanate compound (b1) and a polyhydric alcohol (b2).

2. A starch-based coating composition characterized by comprising as the binder a resin composition obtained by reacting (A) starch and/or modified starch with (B) a compound containing an isocyanate group obtained by reacting a polyisocyanate compound (b1) and a polyhydric alcohol (b2) and with (C) the following vinyl copolymer resin.

Vinyl copolymer resin (C): A resin obtained by radical polymerization of a mixture comprising 1-90 mass % of an aromatic radical polymerizing unsaturated monomer, 1-50 mass % of a hydroxyl-containing radical polymerizing unsaturated monomer and 0-98 mass % of another radical polymerizing unsaturated monomer, with respect to the total weight of (c) the mixture radical polymerizing unsaturated monomers.

3. A starch-based coating composition according to 1 or 2 above, wherein the polyhydric alcohol (b2) is at least one selected from the group consisting of alkylenediols (b21), trivalent or greater alkane polyols (b22), ether polyols (b23) and polyester polyols (b24).

4. A starch-based coating composition according to any one of 1 to 3 above, wherein the starch-based coating composition is dissolved or dispersed in an organic solvent-based medium.

5. A starch-based coating composition according to any one of 1 to 4 above, which further comprises a naturally derived resin.

6. A starch-based coating composition according to 5 above, wherein the naturally derived resin is a nitrocellulose- and/or cellulose-modified substance.

7. A starch-based coating composition according to any one of 1 to 6 above, which further comprises a wax.

8. A coated article which has been coated with a starch-based coating composition according to any one of 1 to 7 above.

The starch-based coating composition of the invention has excellent storage stability and can form coating films with superior drying properties, finished appearances, pencil hardness, mar resistance, adhesion, alkali resistance, solvent resistance and weather resistance. The starch-based coating composition has excellent manageability since it is a one-pack type and its pot life is therefore not a concern, and because it employs naturally derived, biodegradable starting materials, the total $CO_2$ emission during the life cycle of the product is minimal and environmental pollution can be reduced.

Furthermore, because it is a one-pack type paint, it can reduce energy and $CO_2$ emission during baking steps.

The starch-based coating composition utilizes the naturally derived macromolecular material starch and can therefore be stably supplied, and may be applied in a wide range of fields in addition to paints, such as molding agents, inks, adhesives and the like.

DETAILED DESCRIPTION OF THE INVENTION

Preferred modes of the invention will now be explained in detail with the understanding that the invention is not limited only to these modes, and various modifications may be implemented that are within the spirit and scope of the invention.

Starch-Based Coating Composition (1)

The starch-based coating composition (1) is a starch-based coating composition characterized by comprising as the binder a resin composition obtained by reacting (A) starch and/or modified starch with (B) a compound containing an isocyanate group obtained by reacting a polyisocyanate compound (b1) and a polyhydric alcohol (b2).

Starch-Based Coating Composition (2)

The starch-based coating composition (2) is a starch-based coating composition characterized by comprising as the binder a resin composition obtained by reacting (A) starch and/or modified starch with (B) a compound containing an isocyanate group obtained by reacting a polyisocyanate compound (b1) and a polyhydric alcohol (b2), and with (C) a vinyl copolymer resin.

Starch and/or Modified Starch (A)

As starches that are useful for the invention there may be mentioned unmodified grain starches such as corn starch, high amylose starch, wheat starch and rice starch, potato starches such as potato starch and tapioca starch, and esterified, etherified, oxidized, acid treated or dextrinated starch-substituted derivatives of these starches. These starches may be used alone or in combinations of two or more.

Modified starches that are useful for the invention include modified starches comprising aliphatic saturated hydrocarbon groups, aliphatic unsaturated hydrocarbon groups, aromatic hydrocarbon groups and the like bonded by ester bonds and/or ether bonds to starch or starch decomposition products. As starch decomposition products there may be mentioned starch processed by low molecularization treatment with enzymes, acids or oxidizing agents.

The starch or starch decomposition product preferably has a number-average molecular weight of 1,000-2,000,000, more preferably 5,000-500,000 and even more preferably 3,000-100,000 from the viewpoint of film forming properties.

Throughout the present specification, the number-average molecular weight is the value determined according to JIS K0124-83, using TSK GEL4000HXL+G3000HXL+G2500HXL+G2000HXL (product of Tosoh Corp.) in a separating column with tetrahydrofuran for GPC as the eluent under conditions with a temperature of 40° C. and a flow rate of 1.0 ml/min, and performing calculation from a chromatogram obtained with an RI refractometer and a calibration curve based on standard polystyrene.

The method of modifying the modified starch may be ester modification, for example, with the preferred modifying groups being C2-18 acyl groups. The modification may be carried out using a single C2-18 organic acid alone or a combination of two or more.

The extent of modification of the modified starch is preferably to a degree of substitution in the range of 0.5-2.8 and especially in the range of 1.0-2.5. A degree of substitution of less than 0.5 will result in insufficient compatibility with the radical polymerizing unsaturated monomer described hereunder, leading to inadequate finished appearances of the formed coating film. On the other hand, a degree of substitution exceeding 2.8 may reduce the biodegradability.

The modified starch is preferably modified to a degree such that its glass transition point is below the decomposition temperature of starch (approximately 350° C.) and it is thermoplastic and biodegradable; therefore, when the substituent used for modification has a high carbon number it is preferably modified to a low level (for example, when the substituent is C18 stearyl, the degree of ester substitution is preferably in the range of 0.1-1.8), and when the substituent used for modification has a low carbon number it is preferably modified to a high level (for example, when the substituent is C2 acetyl, the degree of ester substitution is preferably in the range of 1.5-2.8).

The degree of substitution is the average number of hydroxyl groups substituted by the modifying agent per monosaccharide unit of the starch, and for example, a degree of substitution of 3 means that all of the three hydroxyl groups per monosaccharide unit of the starch are substituted with the modifying agent, while a degree of substitution of 1 means that only one of the three hydroxyl groups per monosaccharide unit of the starch is substituted with the modifying agent.

As examples of modified starches there may be mentioned a hydrophobic biodegradable starch ester product obtained by mixing anhydrous starch having an amylose content of 50% or greater with an esterifying reagent in an aprotic solvent for reaction between the starch and the esterifying reagent (see Japanese Patent Public Inspection No. 8-502552), a starch ester that has been modified using a vinyl ester as the esterifying reagent, and which is obtained by reaction of starch using a vinyl ester with C2-18 ester groups and with an esterification catalyst in a non-aqueous organic solvent (see Japanese Unexamined Patent Publication No. 8-188601), a starch that has been esterified and grafted with a polyvinyl ester (see Japanese Unexamined Patent Publication No. 8-239402 and Japanese Unexamined Patent Publication No. 8-301994), and a polyester graft polymerization starch alloy comprising a homogeneous blend of a polyester graft polymerization starch having polyester graft chains on the starch molecule wherein all or a portion of the graft chain ends and the hydroxyl groups directly bonded to the starch are blocked with ester groups, and an independent polyester having the same constituent component as the polyester graft chain wherein all or a portion of the terminal hydroxyl groups are blocked with ester groups (see Japanese Unexamined Patent Publication No. 9-31308).

There may also be mentioned short chain/long chain mixed starch esters wherein reactive hydroxyl group hydrogen atoms of the same starch molecule are substituted with C2-4 short-chain acyl groups and C6-18 long-chain acyl groups (see Japanese Unexamined Patent Publication No. 2000-159801), and short chain/long chain mixed starch substituted derivatives wherein reactive hydroxyl groups of the same starch molecule are substituted with C2-4 short-chain hydrocarbon-containing groups and C6-24 long-chain hydrocarbon-containing groups (see Japanese Unexamined Patent Publication No. 2000-159802). Because these modified starches are based on starch, they are biodegradable and have very good solubility and compatibility in solvents.

Isocyanate Group-Containing Compound (B)

The isocyanate group-containing compound (B) may be obtained by reacting a polyisocyanate compound (b1) with a polyhydric alcohol (b2).

The polyisocyanate compound (b1) may be, for example, isophorone diisocyanate, tolylene diisocyanate, diphenylmethane diisocyanate, tolidine diisocyanate, naphthalene diisocyanate, triphenylmethane triisocyanate, tris(phenyl isocyanate) thiophosphate, phenylene diisocyanate, hexamethylene diisocyanate, trimethylhexamethylene diisocyanate, lysine diisocyanate, xylylene diisocyanate, bis(isocyanatomethyl)cyclohexane, bis(isocyanato)methylcyclohexane, dicyclohexylmethane diisocyanate, isopropylidenebis(cyclohexyl isocyanate), 3-(2'-isocyanatocyclohexyl)propyl isocyanate, dianisidine diisocyanate, diphenylether diisocyanate or the like. Preferred among these are isophorone diisocyanate and hexamethylene diisocyanate from the standpoint of hardness, adhesion and impact resistance.

As examples of commercially available products of polyisocyanate compound (b1) there may be mentioned BURNOCK D-750, D-800, DN-950, DN-970 and 15-455 (products of Dainippon Ink and Chemicals, Inc.), DESMODUR L, N, HL and N3390 (products of Bayer Ltd., Germany), TAKENATE D-102, D-170HN, D-202, D-110 and D-123N (products of Takeda Pharmaceutical Co., Ltd.), CORONATE EH, L, HL and 203 (products of Nippon Polyurethane Industry Co., Ltd.) and DURANATE 24A-90CX (product of Asahi Kasei Corp.).

As the polyhydric alcohol (b2) there may be mentioned alkylenediols (b21), trivalent or greater alkane polyols (b22), ether polyols (b23) and polyester polyols (b24), as well as other polyols.

As examples of alkylenediols (b21) there may be mentioned ethylene glycol, propylene glycol, 1,3-butyleneglycol, 1,4-butanediol, 1,5-pentanediol, 1,6-hexanediol, neopentylglycol, cyclohexane-1,4-dimethylol, neopentylglycol, 2-methyl-2,4-pentanediol, hydrogenated bisphenol A, and the like.

As trivalent or greater alkane polyols (b22) there may be mentioned triols such as glycerin, trimethylolethane and trimethylolpropane, and tetravalent or greater alkylene polyols such as pentaerythritol, α-methyl glycoside and sorbitol.

As examples of ether polyols (b23) there may be mentioned polyols produced by ring-opening addition reaction of alkylene oxides such as ethylene oxide, propylene oxide, butylene oxide and tetrahydrofuran, as well as diethylene glycol, dipropylene glycol, polyethylene glycol, polypropylene glycol, polytetramethylene glycol, triethylene glycol, poly(oxyethylene/oxypropylene)glycol, bisphenol A-polyethyleneglycol ether, bisphenol A-polypropyleneglycol ether, sucrose, dipentaerythritol and the like.

As examples of polyester polyols (b24) there may be mentioned polyols obtained by polycondensation reaction between an organic dicarboxylic acid or its anhydride with an organic diol component, in an excess of the organic diol. Specifically, there may be mentioned polyester polyols that are adipic acid and ethylene glycol condensation products or adipic acid and neopentylglycol condensation products.

The organic dicarboxylic acid used in this case is a C2-44 and especially C4-36 aliphatic, alicyclic or aromatic dicarboxylic acid, and as examples there may be mentioned succinic acid, adipic acid, azelaic acid, sebacic acid, maleic acid, fumaric acid, glutaric acid, hexachloroheptanedicarboxylic acid, cyclohexanedicarboxylic acid, o-phthalic acid, isophthalic acid, terephthalic acid, tetrahydrophthalic acid, tetrachlorophthalic acid and the like. In addition to these dicarboxylic acids, there may also be included small amounts of polycarboxylic anhydrides or unsaturated fatty acid addition products with three or more carboxyl groups. As examples of organic diol components there may be mentioned alkylene glycols such as ethylene glycol, propylene glycol, 1,4-butanediol, 1,5-pentanediol, 1,6-hexanediol and neopentyl glycol, and 1,4-cyclohexanedimethanol, 2-butyl-2-ethyl-1,3-propanediol, 3-methyl-1,5-pentanediol, 2-methyl-2,4-pentanediol and the like, which may be used in combination with small amounts of trivalent or greater polyols such as trimethylolpropane, glycerin or pentaerythritol as appropriate.

Among the polyhydric alcohols (b2) mentioned above there may be mentioned as particularly suitable ethylene glycol, propylene glycol, 1,4-butanediol, 1,6-hexanediol, diethylene glycol, triethylene glycol, hydrogenated bisphenol A, glycerin, trimethylolethane, trimethylolpropane, pentaerythritol, dipentaerythritol, polyethylene glycol, polypropylene glycol, polytetramethylene glycol, poly(oxyethylene/oxypropylene)glycol, bisphenol A-ethylene glycol ether, bisphenol A-polypropylene glycol ether and the like, from the standpoint of impact resistance and flex resistance. The reaction between the polyisocyanate compound (b1) and polyhydric alcohol (b2) may be carried out in an organic solvent, for example, a hydrocarbon-based solvent such as toluene, xylene, cyclohexane or n-hexane, an ester-based solvent such as methyl acetate, ethyl acetate or butyl acetate, a ketone-based solvent such as acetone, methyl ethyl ketone, methyl isobutyl ketone or methyl amyl ketone, or a mixture of such solvents. As the reaction proportion of the polyisocyanate compound (b1) and polyhydric alcohol (b2), the number of moles of OH groups based on the polyhydric alcohol (b2) with respect to the number of moles of NCO groups based on the polyisocyanate compound (b1) (NCO/OH)=1/0.4-0.95 and preferably 1/0.5-0.9, and a solution of the isocyanate group-containing compound (B) may be produced by mixing the polyisocyanate compound (b1) and polyhydric alcohol (b2) in a manner that leaves free isocyanate groups, with appropriate addition of a catalyst such as monobutyltin oxide or dibutyltin oxide, at a temperature between about 50° C. to about 200° C. and preferably about 60-150° C. for between 30 minutes and 10 hours and preferably about 1-5 hours while stirring. The NCO value of the obtained isocyanate group-containing compound (B) is preferably in the range of 5-250 mgNCO/g and especially 7-200 mgNCO/g.

Vinyl Copolymer Resin (C)

The vinyl copolymer resin (C) may be obtained by radical polymerization of a radical polymerizing unsaturated monomer mixture (c) in the presence of an organic solvent and polymerization initiator.

A coating film with excellent finished appearances, adhesion, solvent resistance, alkali resistance, impact resistance and flex resistance can be formed if the radical polymerizing unsaturated monomer mixture (c) is a radical polymerizing unsaturated monomer mixture comprising 1-90 mass %, preferably 5-80 mass % and more preferably 10-85 mass % of an aromatic radical polymerizing unsaturated monomer, 1-50 mass %, preferably 2-40 mass % and more preferably 5-30 mass % of a hydroxyl group-containing radical polymerizing unsaturated monomer and 0-98 mass %, preferably 2-95 mass % and more preferably 5-90 mass % of another radical polymerizing unsaturated monomer, with respect to the total weight of the mixture (c).

As examples of aromatic radical polymerizing unsaturated monomers there may be mentioned styrene, vinyltoluene, 2-methylstyrene, t-butylstyrene, chlorstyrene, vinylnaphthalene and the like.

As hydroxyl group-containing radical polymerizing unsaturated monomers there may be mentioned hydroxyalkyl esters of acrylic acid or methacrylic acid with C2-8 alkyl groups, such as 2-hydroxyethyl acrylate, 2-hydroxyethyl methacrylate, hydroxypropyl acrylate, hydroxypropyl methacrylate, 4-hydroxybutyl acrylate, 4-hydroxybutyl methacrylate, 2-hydroxypropyl methacrylate and 3-hydroxypropyl methacrylate, and hydroxyalkyl (meth)acrylate ester lactone-modified compounds (PLACCEL F Series, product of Dicel Chemical Industries, Ltd.) Preferred is at least one compound selected from the group consisting of 2-hydroxyethyl acrylate, 2-hydroxyethyl methacrylate, hydroxypropyl acrylate, hydroxypropyl methacrylate and 4-hydroxybutyl acrylate, from the standpoint of improving compatibility with the starch and/or modified starch (A) and the isocyanate group-containing compound (B), to ensure stability of the paint.

As other radical polymerizing unsaturated monomers there may be mentioned carboxyl group-containing polymerizable unsaturated monomers such as (meth)acrylic acid, maleic acid, crotonic acid, itaconic acid and fumaric acid, for example, C1-18 alkyl esters or cycloalkyl esters of acrylic acid or methacrylic acid such as methyl acrylate, ethyl acrylate, n-propyl acrylate, isopropyl acrylate, n-, i- or t-butyl acrylate, hexyl acrylate, 2-ethylhexyl acrylate, n-octyl acrylate, decyl acrylate, lauryl acrylate, cyclohexyl acrylate, methyl methacrylate, ethyl methacrylate, n-propyl methacrylate, isopropyl methacrylate, n-, i- or t-butyl methacrylate, hexyl methacrylate, octyl methacrylate, decyl methacrylate, lauryl methacrylate and cyclohexyl methacrylate, or N-substituted acrylamide-based or N-substituted methacrylamide-based monomers such as N-methylolacrylamide, N-butoxymethylacrylamide, N-methoxymethylacrylamide, N-methylolmethacrylamide and N-butoxymethylmethacrylamide, and these polymerizable unsaturated monomers include fatty acid-modified polymerizable unsaturated monomers.

Fatty acid-modified polymerizable unsaturated monomers include polymerizable unsaturated monomers having polymerizable unsaturated groups at the ends of fatty acid-derived hydrocarbon chains. As examples of fatty acid-modified polymerizable unsaturated monomers there may be mentioned those obtained by reacting fatty acids with epoxy group-containing polymerizable unsaturated monomers or hydroxyl group-containing polymerizable unsaturated monomers.

As fatty acids there may be mentioned drying oil fatty acids, semi-drying oil fatty acids and non-drying oil fatty acids, among which examples of drying oil fatty acids and semi-drying oil fatty acids include fish oil fatty acids, dehydrated castor oil fatty acids, safflower oil fatty acids, linseed oil fatty acids, soybean oil fatty acids, sesame oil fatty acids, poppy oil fatty acids, perilla oil fatty acids, hempseed oil fatty acids, grape seed oil fatty acids, corn oil fatty acids, tall oil fatty acids, sunflower oil fatty acids, cottonseed oil fatty acids, walnut oil fatty acids, rubberseed oil fatty acids and high-dienoic acid-containing fatty acids, and examples of non-drying oil fatty acids include coconut oil fatty acids, hydrogenated coconut oil fatty acids and palm oil fatty acids. These may be used alone or in combinations of two or more. These fatty acids may also be used in combination with caproic acid, capric acid, lauric acid, myristic acid, palmitic acid, stearic acid and the like.

As monomers to be reacted with the fatty acids for production of the fatty acid-modified polymerizable unsaturated monomers, there are preferred epoxy group-containing polymerizable unsaturated monomers, examples of which include glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether.

The vinyl copolymer resin (C) may be easily prepared by, for example, radical polymerization of the aforementioned radical polymerizing unsaturated monomer mixture (c) in an organic solvent in the presence of a polymerization initiator, and specifically, the desired product may be obtained by uniformly adding the radical polymerizing unsaturated monomer mixture (c) and the polymerization initiator mixture dropwise for reaction, for example, at a reaction temperature of 60-200° C. and preferably 80-180° C., for between about 30 minutes and 6 hours and preferably 1-5 hours.

The organic solvent used may be, for example, a hydrocarbon-based solvent such as toluene, xylene, cyclohexane or n-hexane, an ester-based solvent such as methyl acetate, ethyl acetate or butyl acetate, a ketone-based solvent such as acetone, methyl ethyl ketone, methyl isobutyl ketone or methyl amyl ketone, or a mixture thereof.

The obtained vinyl copolymer resin (C) preferably has a hydroxyl value of 5-400 mgKOH/g and a weight-average molecular weight in the range of 3,000-100,000 and especially 5,000-20,000.

The vinyl copolymer resin (C) produced in this manner may be suitably used as a starch-based paint binder having dissolved or dispersed in an organic solvent-based medium.

Production of Starch-Based Coating Composition (1)

The starch-based coating composition (1) is produced using as the binder a resin composition obtained by reacting (A) starch and/or modified starch with (B) an isocyanate group-containing compound obtained by reacting a polyisocyanate compound (b1) and a polyhydric alcohol (b2). The mixing proportion of the starch and/or modified starch (A) and the isocyanate group-containing compound (B) may be appropriately adjusted for the desired coating film performance.

Preferably, the resin composition used for the starch-based coating composition (1) is obtained by addition reaction with amounts of 50-99 mass % and more preferably 60-98 mass % of the starch and/or modified starch (A) and 1-50 mass % and more preferably 2-40 mass % of the isocyanate group-containing compound (B), based on the total solid weight of the starch and/or modified starch (A) and the isocyanate group-containing compound (B), mixed in an organic solvent, for example, a hydrocarbon-based solvent such as toluene, xylene, cyclohexane or n-hexane, an ester-based solvent such as methyl acetate, ethyl acetate or butyl acetate, a ketone-based solvent such as acetone, methyl ethyl ketone, methyl isobutyl ketone or methyl amyl ketone or a mixture of these solvents, with addition of a suitable catalyst such as monobutyltin oxide or dibutyltin oxide, at a temperature of between about 50° C. and about 200° C. and more preferably about 60-150° C. for a period of 30 minutes to 10 hours and more preferably about 1-5 hours while stirring. The number-average molecular weight of the obtained resin composition is preferably in the range of 3,000-200,000 and more preferably in the range of 5,000-100,000. The resin composition produced in this manner may be suitably used as a starch-based paint binder dissolved or dispersed in an organic solvent-based medium. If the amount of the starch and/or modified starch (A) is less than 50 mass % the proportion of naturally derived components will be low, while if it is greater than 99 mass % the chemical resistance of the coating film may be reduced. If the amount of the isocyanate group-containing compound (B) is less than 1 mass % the chemical resistance of the coating film may be reduced, and if it is greater than 50 mass % the proportion of naturally derived components will be low, potentially reducing the solvent solubility of the resin.

Production of Starch-Based Coating Composition (2)

The starch-based coating composition (2) is produced using as the binder a resin composition obtained by reacting (A) starch and/or modified starch with (B) an isocyanate group-containing compound obtained by reacting a polyisocyanate compound (b1) and a polyhydric alcohol (b2), and with (C) a vinyl copolymer resin. The mixing proportions of the starch and/or modified starch (A), the isocyanate group-containing compound (B) and the vinyl copolymer resin (C) may be appropriately adjusted for the desired coating film performance.

Preferably, the resin composition used for the starch-based coating composition (2) is obtained by reaction with amounts of 60-99 mass % and more preferably 65-95 mass % of the starch and/or modified starch (A), 1-39 mass % and more preferably 2-33 mass % of the isocyanate group-containing compound (B) and 1-39 mass % and more preferably 2-33 mass % of the vinyl copolymer resin (C), based on the total solid weight of the starch and/or modified starch (A), the isocyanate group-containing compound (B) and the vinyl copolymer resin (C), mixed in the same type of organic solvent used for production of the starch-based coating composition (1), with addition of a suitable tin catalyst such as monobutyltin oxide or dibutyltin oxide, at a temperature of between about 50° C. and about 200° C. and more preferably about 60-150° C. for a period of 30 minutes to 10 hours and more preferably about 1-5 hours while stirring. The number-average molecular weight of the obtained resin composition is preferably in the range of 3,000-200,000 and more preferably in the range of 5,000-100,000. The resin composition produced in this manner may be suitably used as a starch-based paint binder dissolved or dispersed in an organic solvent-based medium. If the amount of the starch and/or modified starch (A) is less than 50 mass % the proportion of naturally derived components will be reduced, while if it is greater than 99 mass % the chemical resistance and adhesion of the coating film may be reduced. If the amount of the isocyanate group-containing compound (B) is less than 1 mass % the storage stability of the varnish and the chemical resistance of the coating film may be reduced, and if it is greater than 50 mass % the proportion of naturally derived components will be low, thus reducing the solvent solubility of the resin. If the amount of the vinyl copolymer resin (C) is less than 1 mass % the adhesion and chemical resistance of the coating film may be reduced, and if it is greater than 50 mass % the proportion of naturally derived components will be reduced.

The resin composition used for the starch-based coating composition (1) or the resin composition used for the starch-based coating composition (2) may be used in conventional known paint systems such as powder coatings, water-based paints, organic solvent-type paints and the like. Examples of organic solvent-type paints to be used include reactive solvents and diluting solvents, for example, hydrocarbon-based organic solvents such as toluene, xylene, cyclohexane and n-hexane, ester-based organic solvents such as methyl acetate, ethyl acetate and butyl acetate, and ketone-based organic solvents such as acetone, methyl ethyl ketone, methyl isobutyl ketone and methyl amyl ketone, either alone or in combinations of two or more, for dissolution or dispersion of the resin to form a starch-based coating composition.

Naturally Derived Resins

The starch-based coating composition (1) or starch-based coating composition (2) of the invention may if necessary contain other naturally derived resins as well. As examples of natural derived resins other than starch-based resins there may be mentioned plant fibers or cellulose resins, polyhydroxycarboxylic acids such as polylactic acid, or polycaprolactam, modified polyvinyl alcohols and the like. Aliphatic polyesters such as polycaprolactone are also biodegradable.

A large number of biodegradable resins other than those mentioned above are also known. According to the invention, any natural derived resin that is soluble in the solvent may be used, although cellulose resins are preferred.

It was found in developing the invention that adding a small amount of nitrocellulose and/or cellulose acetate butyrate to the starch-based coating composition (1) or starch-based coating composition (2) improves the drying property of the coating film when used as a one-pack type lacquer paint, and provides greater surface hardness.

Although an effect of increased surface hardness was also found with polyhydroxycarboxylic acids and particularly polylactic acid, they tended to produce friable coating films, whereas cellulose-derived resins resulted in a better balance of coating film performance and easier use.

As nitrocelluloses that may be suitably used for the invention, there may be mentioned the industrial nitrocellulose BNC-HIG-2 (product of Bergerac NC, France) and the industrial nitrocelluloses RS1-4 (product of CNC, South Korea), SwanCel HM1-4 (product of Hyupseon Corp.) and Sernova BTH1-4 (product of Asahi Kasei Corp.), and as cellulose acetate butyrate products there may be mentioned CAB381-0.1, CAB381-0.5, CAB381-2, CAB531-1, CAB551-0.01 and CAB551-0.2 (products of Eastman Chemical Products, USA).

These naturally derived resins are added at no greater than 50 parts by weight, preferably 5-40 parts by weight and more preferably 10-35 parts by weight with respect to 100 parts by weight as the total solid portion of the starch and/or modified starch (A) and compound (B) as the binder or the starch and/or modified starch (A), compound (B) and vinyl copolymer resin (C) as the binder, from the standpoint of maintaining satisfactory starch-based coating composition drying properties and coating film mar resistance and solvent resistance.

The starch-based coating composition (1) or starch-based coating composition (2) of the invention may also contain, if necessary, organic coloring agents, natural dyes, inorganic pigments and brightening materials. As organic coloring agents there may be mentioned those prescribed by the Health and Welfare Ministry Ordinance No. 37. For example, there may be mentioned Red #202 (Lithol rubin BCA), Red #203 (Lake red C), Red #204 (Lake red CBA), Red #205 (Lithol red), Red #206 (Lithol red CA), Red #207 (Lithol red BA), Red #208 (Lithol red SR), Red #219 (Brilliant lake red R), Red #220 (Deep maroon), Red #221 (Toluidine red), Red #228 (Permaton red), Orange #203 (Permanent orange), Orange #204 (Bentizine orange G), Yellow #205 (Bentizine yellow G), Red #404 (Brilliant fast scarlet), Red #405 (Permanent red F5R), Orange #401 (Hansa orange), Yellow #401 (Hansa yellow), Blue #404 (Phthalocyanine blue) and the like.

As natural dyes there may be mentioned carotenoids such as carotene, carotenal, capsanthin, lycopene, bixin, crocin, canthaxanthin and annatto, flavonoids including anthocyanidins such as shisonin, raphanin, enocyanin, chalcones such as safrole yellow and safflower, flavonols such as rutin and quercetin, flavones such as cacao pigment, flavins including riboflavin and the like, quinones including anthraquinones such as laccaic acid, carminic acid (cochineal), kermesic acid and alizarin or naphthoquinones such as shikonin, alkannin and echinochrome, porphyrins including chlorophyll and hemoglobin, diketones including curcumin (turmeric) and betacyanidins including betanin and the like.

As inorganic pigments there may be mentioned anhydrous silicic acid, magnesium silicate, talc, kaolin, bentonite, mica, titanium mica, oxybismuth chloride, zirconium oxide, magnesium oxide, zinc oxide, titanium oxide, light calcium carbonate, heavy calcium carbonate, light magnesium carbonate, heavy magnesium carbonate, barium sulfate, yellow iron oxide, red iron oxide, black iron oxide, ultramarine, chromium oxide, chromium hydroxide, carbon black, calamine and the like.

A brightening material is a scaly pigment that imparts a shiny bright appearance or light interfering property to a coating film, and as examples there may be mentioned scaly aluminum, vapor deposited aluminum, aluminum oxide, oxybismuth chloride, mica, titanium oxide, coated mica, iron oxide-coated mica, micaceous iron oxide, titanium oxide-coated silica, titanium oxide-coated alumina, iron oxide-coated silica, iron oxide-coated alumina, glass flakes, colored glass flakes, vapor deposited glass flake hologram films, and the like. The sizes of such brightening materials is preferably 1-30 μm in the lengthwise direction and a thickness of 0.001-1 μm.

The mixing proportion of the organic pigment, natural dye, inorganic pigment and brightening material may be appropriately established depending on the purpose of use and the desired performance, but normally it will be in the range of 0.001-400 parts by weight and preferably 0.01-200 parts by weight with respect to 100 parts by weight of the starch-based resin composition.

If necessary, the starch-based coating composition (1) or starch-based coating composition (2) may also contain added crosslinking agents, plasticizers, ultraviolet stabilizers, metal driers, fluidity adjustors, anticissing agents, antidrip agents, antioxidants, delustering agents, polishing agents, antiseptic agents, curing accelerators, antiabrasion agents, antifoaming agents and the like that are known in the prior art.

A coated article of the invention is obtained by coating the surface of a base material with the starch-based coating composition of the invention described above. The base material to be coated with the starch-based coating composition is not particularly restricted, and as examples there may be mentioned metals, plastics, glass, ceramics, concrete, paper, fibers, wood materials, plant substances, stone, sand and the like.

A liquid starch-based coating composition (1) or starch-based coating composition (2) may be coated or printed by, for example, roller coating, brush coating, dip coating, spray coating (non-electrostatic coating or electrostatic coating), curtain flow coating, screen printing or the like.

The coated coating film may be dried by bake drying at 100-200° C. for between 30 seconds and 120 minutes, and preferably at 110-150° C. for between 20-90 minutes. It may also be dried at a temperature below 100° C. for 1-40 minutes and then allowed to stand for more than 10 hours at ordinary temperature (below 50° C.), or allowed to stand for 1-7 days at ordinary temperature (below 50° C.) to form a continuous coating film with the water or organic solvent evaporated out of the coating film. The thickness of the coating film is not particularly restricted, but the dry thickness will generally be an average of 1-200 μm, preferably 2-100 μm and more preferably 5-50 μm.

The present invention will now be described in greater detail by examples, with the understanding that the invention is not limited to these examples. The "parts" and "%" values through the examples, unless otherwise specified, refer to "parts by mass" and "mass %".

Production of Modified Starch (A)

PRODUCTION EXAMPLE 1

Production Example for Modified Starch No. 1

After suspending 25 parts of high amylose corn starch (product of Nihon Cornstarch Corp., hydroxyl value: 500 mgKOH/g) in 200 parts of dimethylsulfoxide (DMSO), the mixture was heated to 90° C. while stirring and the temperature was maintained for 20 minutes for gelatinization. To this solution there was added 20 parts of heavy sodium carbonate as a catalyst, and then 17 parts of vinyl laurate was added while maintaining the temperature of 90° C., for 1 hour of reaction at that temperature. After then adding 37 parts of vinyl acetate, reaction was continued at 80° C. for 1 hour. The reaction solution was then poured into tap water, and the mixture was stirred at high speed for disintegration and then filtered and dewatered to prepare modified starch No. 1.

Production of Isocyanate Group-Containing Compound (B)

PRODUCTION EXAMPLE 2

Production Example for Polyurethane Resin Solution No. 1

In a 1 L reactor equipped with a thermometer, thermostat, stirrer, condenser tube and dropper there were charged 125 parts of toluene and 377 parts of isophorone diisocyanate, and the mixture was stirred under a nitrogen atmosphere and heated to 80° C. Next, 123 parts of 1,4-butanediol was added dropwise over a period of 3 hours, and upon completion of the dropwise addition it was matured at 80° C. for 30 minutes to prepare polyurethane resin solution No. 1 with a resin solid portion of 80%.

The NCO value of the obtained polyurethane resin No. 1 was 55 mgNCO/g.

PRODUCTION EXAMPLE 3

Production Example for Polyurethane Resin Solution No. 2

In a 1 L reactor equipped with a thermometer, thermostat, stirrer, condenser tube and dropper there were charged 125 parts of toluene and 325 parts of isophorone diisocyanate, and the mixture was stirred under a nitrogen atmosphere and heated to 80° C. Next, 117 parts of triethylene glycol was added dropwise over a period of 3 hours, and upon completion of the dropwise addition it was matured at 80° C. for 30 minutes to prepare polyurethane resin solution No. 2 with a resin solid portion of 80%.

The NCO value of the obtained polyurethane resin No. 2 was 57 mgNCO/g.

Production of Vinyl Copolymer Resin (C)

PRODUCTION EXAMPLE 4

Production Example for Acryl Resin Solution No. 1

In a 1 L reactor equipped with a thermometer, thermostat, stirrer, condenser tube and dropper there was charged 333 parts of toluene, and the mixture was stirred under a nitrogen atmosphere and heated to 100° C. Next, the mixed solution No. 1 below was added dropwise over a period of 4 hours, and upon completion of the dropwise addition it was matured at 100° C. for 1 hour to prepare acryl resin solution No. 1 with a resin solid portion of 60%.

The hydroxyl value of the obtained acryl resin was 86 mgKOH/g.

| Mixture No. 1 | |
|---|---|
| Styrene | 200 parts |
| Methyl methacrylate | 150 parts |
| n-Butyl acrylate | 50 parts |
| 2-Hydroxyethyl methacrylate | 100 parts |
| 2,2'-Azobis(2-methylbutyronitrile) | 25 parts |

COMPARATIVE PRODUCTION EXAMPLE 1-4

Vinyl copolymer composition solutions No. 2-No. 5 were obtained in the same manner as Production Example 4, except that the compositions were as listed in Table 1.

TABLE 1

| | | Production Example 4 | Compar. Production Example 1 | Compar. Production Example 2 | Compar. Production Example 3 | Compar. Production Example 4 |
|---|---|---|---|---|---|---|
| | Vinyl copolymer composition solution | No. 1 | No. 2 | No. 3 | No. 4 | No. 5 |
| Mixture | Styrene | 200 | 0 | 200 | 475 | 50 |
| | Methyl methacrylate | 150 | 350 | 250 | 0 | 50 |
| | n-Butyl acrylate | 50 | 50 | 50 | 10 | 50 |
| | 2-Hydroxyethyl methacrylate | 100 | 100 | 0 | 15 | 350 |
| | 2,2'-Azobis(2-methylbutyronitrile) | 25 | 25 | 25 | 25 | 25 |
| Properties | Resin solid content (%) | 60 | 60 | 60 | 60 | 60 |
| | Hydroxyl value (mgKOH/g) | 86 | 86 | 0 | 13 | 301 |

The values for the contents are parts by mass.

Production of Starch-Based Resins

PRODUCTION EXAMPLE 5

Production Example for Starch-Based Resin No. 1

In a 1 L reactor equipped with a thermometer, thermostat, stirrer and condenser tube there was charged 595 parts of butyl acetate, and the mixture was heated to 50° C. while stirring under a nitrogen atmosphere. Next, 180 parts of the modified starch No. 1 obtained in Production Example 1 kept at 50° C. was charged into the reactor, prior to heating at 100° C. and stirring until complete dissolution of the charged modified starch No. 1.

Next, 25 parts of a solution of polyurethane resin No. 1 obtained in Production Example 2 was charged into the reactor and stirring was continued to uniformity, after which 0.02 part of dibutyltin dilaurate was added as a catalyst and reaction was conducted at 100° C. for 6 hours while stirring under a nitrogen atmosphere to obtain a solution of starch-based resin No. 1 with a solid content of 25%.

The NCO value of the obtained starch-based resin No. 1 solution was 0.4 mgNCO/g.

PRODUCTION EXAMPLES 6-8

Production Examples for Starch-Based Resins No. 2-No. 4

Solutions of starch-based resins No. 2-No. 4 were obtained in the same manner as Production Example 5, except that the compositions were as listed in Table 2.

The properties of the obtained resins are listed in Table 2.

PRODUCTION EXAMPLE 9

Production Example for Starch-Based Resin No. 5

In a 1 L reactor equipped with a thermometer, thermostat, stirrer and condenser tube there was charged 581.5 parts of butyl acetate and 33.4 parts of vinyl copolymer resin solution No. 1 obtained in Production Example 4, and then the mixture was heated to 50° C. while stirring under a nitrogen atmosphere. Next, 160 parts of the modified starch No. 1 obtained in Production Example 1 kept at 50° C. was charged into the reactor prior to heating to 100° C. and stirring until complete dissolution of the charged modified starch No. 1. Next, 25 parts of polyurethane resin solution No. 1 obtained in Production Example 2 was charged into the reactor and stirring was continued to uniformity, after which 0.02 part of dibutyltin dilaurate was added as a catalyst and reaction was conducted at 100° C. for 6 hours while stirring under a nitrogen atmosphere to obtain starch-based resin No. 5 solution with a solid content of 25%.

The NCO value of the obtained starch-based resin No. 5 was 0.4 mgNCO/g.

PRODUCTION EXAMPLES 10-12

Production Examples for Starch-Based Resins No. 6-No. 8

Solutions of starch-based resins No. 6-No. 8 were obtained in the same manner as Production Example 5, except that the compositions were as listed in Table 2.

The properties of the obtained resins are listed in Table 2.

COMPARATIVE PRODUCTION EXAMPLE 5

In a 1 L reactor equipped with a thermometer, thermostat, stirrer and condenser tube there was charged 600 parts of butyl acetate, and the mixture was heated to 50° C. while stirring under a nitrogen atmosphere. Next, 200 parts of the modified starch No. 1 obtained in Production Example 1 kept at 50° C. was charged into the butyl acetate in the reactor while dissolving it, and the solution was heated to 100° C. and stirred to dissolution at 100° C. for 1 hour to obtain starch-based resin No. 9 solution with a solid portion of 25%.

COMAPARATIVE PRODUCTION EXAMPLE 6

In a 1 L reactor equipped with a thermometer, thermostat, stirrer and condenser tube there was charged 573.4 parts of butyl acetate and 66.6 parts of the acryl resin solution No. 1 obtained in Production Example 4, and the mixture was heated to 50° C. while stirring under a nitrogen atmosphere. Next, 160 parts of the modified starch No. 1 obtained in Production Example 1 kept at 50° C. was charged into the butyl acetate in the reactor while dissolving it, and the solution was heated to 100° C. and stirred to dissolution at 100° C. for 1 hour to obtain starch-based resin No. 10 solution with a solid portion of 25%.

COMPARATIVE PRODUCTION EXAMPLES 7-10

Solutions of starch-based resins No. 11-No. 14 were obtained in the same manner a Example 5, except that the compositions were as listed in Table 1.

TABLE 2

| | | | Production Example 5 | Production Example 6 | Production Example 7 | Production Example 8 | Production Example 9 | Production Example 10 | Production Example 11 | Production Example 12 |
|---|---|---|---|---|---|---|---|---|---|---|
| | Starch-based resin | | No. 1 | No. 2 | No. 3 | No. 4 | No. 5 | No. 6 | No. 7 | No. 8 |
| Contents | (A) | Modified starch No. 1 | 180 (180) | 160 (160) | 190 (190) | 180 (180) | 160 (160) | 140 (140) | 170 (170) | 140 (140) |
| | (B) | Polyurethane resin solution No. 1 | 25 (20) | 50 (40) | 12.5 (10) | | 25 (20) | 25 (20) | 25 (20) | |
| | | Polyurethane resin solution No. 2 | | | | 25 (20) | | | | 25 (20) |
| | (C) | Vinyl copolymer composition No. 1 | | | | | 33.4 (20) | 66.6 (40) | 16.7 (10) | 66.6 (40) |
| | | Vinyl copolymer composition No. 2 | | | | | | | | |
| | | Vinyl copolymer composition No. 3 | | | | | | | | |
| | Catalyst | Dibutyltin dilaurate | 0.02 | 0.02 | 0.02 | 0.02 | 0.02 | 0.02 | 0.02 | 0.02 |
| | Diluting solvent | Butyl acetate | 595.0 | 590.0 | 597.5 | 595.0 | 581.6 | 568.4 | 588.3 | 568.4 |
| Values for properties | | Solid content 25% | 800 (200) | 800 (200) | 800 (200) | 800 (200) | 800 (200) | 800 (200) | 800 (200) | 800 (200) |
| | | NCO value (mg NCO/g) | 0.4 | 0.6 | 0.2 | 0.4 | 0.4 | 0.4 | 0.6 | 0.4 |

The values for the contents are parts by mass, with solid contents in parentheses.

TABLE 3

|  |  |  | Comp. Production Example 5 | Comp. Production Example 6 | Comp. Production Example 7 | Comp. Production Example 8 | Comp. Production Example 9 | Comp. Production Example 10 |
|---|---|---|---|---|---|---|---|---|
| Contents | | Starch-based resin | No. 9 | No. 10 | No. 11 | No. 12 | No. 13 | No. 14 |
| | (A) | Modified starch No. 1 | 200 (200) | 160 (160) | 140 (140) | 140 (140) | 140 (140) | 140 (140) |
| | (B) | Polyurethane resin solution No. 1 | | | 25 (20) | 25 (20) | 25 (20) | 25 (20) |
| | | Polyurethane resin solution No. 2 | | | | | | |
| | (C) | Vinyl copolymer composition No. 1 | | 66.6 (40) | | | | |
| | | Vinyl copolymer composition No. 2 | | | 66.6 (40) | | | |
| | | Vinyl copolymer composition No. 3 | | | | 66.6 (40) | | |
| | | Vinyl copolymer composition No. 4 | | | | | 66.6 (40) | |
| | | Vinyl copolymer composition No. 5 | | | | | | 66.6 (40) |
| | Catalyst | Dibutyltin dilaurate | | | 0.02 | 0.02 | 0.02 | 0.02 |
| | Diluting solvent | Butyl acetate | 600.0 | 573.4 | 568.4 | 568.4 | 568.4 | 568.4 |
| Values for properties | | Solid content 25% | 800 (200) | 800 (200) | 800 (200) | 800 (200) | 800 (200) | 800 (200) |
| | | NCO value (mg NCO/g) | — | — | 0.3 | 0.7 | 0.7 | 0.2 |

The values for the contents are parts by mass, with solid contents in parentheses.

Production of Starch-Based Coating Composition (1)

EXAMPLE 1

Production Example for Starch-Based Paint No. 1

After combining 400 parts of the starch-based resin No. 1 solution obtained in Production Example 5 (100 parts solid portion), 46 parts of ALPASTE FX-7640NS (*1) (23 parts solid portion), 3 parts of HICONC BLACK (*2) (3 parts solid portion), 1.5 parts of SILYSIA 446 (*3) (1.5 parts solid portion) and 59.5 parts of methyl ethyl ketone, the mixture was thoroughly blended with a stirrer to obtain starch-based paint No. 1 with a solid portion of 25%.

EXAMPLES 2-9

Production Examples for Starch-Based Paints No. 2-No. 9

Starch-based paints No. 2-No. 9 were obtained in the same manner as Example 1, except that the compositions were as listed in Table 4.

TABLE 4

|  |  |  |  | Example 1 | Example 2 | Example 3 | Example 4 | Example 5 | Example 6 | Example 7 | Example 8 | Example 9 |
|---|---|---|---|---|---|---|---|---|---|---|---|---|
| Amounts added | | Starch-based paint | | No. 1 | No. 2 | No. 3 | No. 4 | No. 5 | No. 6 | No. 7 | No. 8 | No. 9 |
| | Resin component | Starch-based resin composition No. 1 solution Solid content 25% | | 400 (100) | | | | 400 (100) | 400 (100) | 400 (100) | 400 (100) | 400 (100) |
| | | Starch-based resin composition No. 2 solution Solid content 25% | | | 400 (100) | | | | | | | |
| | | Starch-based resin composition No. 3 solution Solid content 25% | | | | 400 (100) | | | | | | |
| | | Starch-based resin composition No. 4 solution Solid content 25% | | | | | 400 (100) | | | | | |

TABLE 4-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Pigment/coloring component | ALPASTE FX7640 (*1) | 46 (23) | 46 (23) | 46 (23) | 46 (23) | 46 (23) | 46 (23) | 46 (23) | 46 (23) | 46 (23) |
|  | HICONC BLACK (*2) | 3 (3) | 3 (3) | 3 (3) | 3 (3) | 3 (3) | 3 (3) | 3 (3) | 3 (3) | 3 (3) |
|  | SILYSIA 446 (*3) | 1.5 (1.5) | 1.5 (1.5) | 1.5 (1.5) | 1.5 (1.5) | 1.5 (1.5) | 1.5 (1.5) | 1.5 (1.5) | 1.5 (1.5) | 1.5 (1.5) |
| Wax | HIFLAT F-713 (*4) |  |  |  |  | 2 (2) | 2 (2) | 2 (2) |  | 2 (2) |
|  | TFW-3000F (*5) |  |  |  |  |  |  |  | 15 (2) |  |
| Additives | Industrial nitrocellulose (*6) BNC-HIG-2 |  |  |  |  |  | 75 (15) | 150 (30) | 150 (30) |  |
|  | CAB551-0.2 (*7) |  |  |  |  |  |  |  |  | 150 (30) |
| Solvent | Methyl ethyl ketone | 59.5 | 59.5 | 59.5 | 59.5 | 65.5 | 50.5 | 35.5 | 22.5 | 35.5 |
| 25% Paint |  | 510 (127.5) | 510 (127.5) | 510 (127.5) | 510 (127.5) | 518 (129.5) | 578 (144.5) | 638 (159.5) | 638 (159.5) | 638 (159.5) |

Values in parentheses represent solid contents.

Production of Starch-Based Coating Composition (2)

EXAMPLE 10

Production Example for Starch-Based Paint No. 10

After combining 400 parts of the starch-based resin No. 5 solution obtained in Production Example 9 (100 parts solid portion), 46 parts of ALPASTE FX-7640NS (*1) (23 parts solid portion), 3 parts of HICONC BLACK (*2), 1.5 parts of SILYSIA 446 (*3) (1.5 parts solid portion) and 59.5 parts of methyl ethyl ketone, the mixture was thoroughly blended with a stirrer to obtain starch-based paint No. 10 with a solid portion of 25%.

EXAMPLES 11-18

Production Examples for Starch-Based Paints No. 11-No. 18

Starch-based paints No. 11-No. 18 were obtained in the same manner as Example 10, except that the compositions were as listed in Table 5.

TABLE 5

|  |  |  | Example 10 | Example 11 | Example 12 | Example 13 | Example 14 | Example 15 | Example 16 | Example 17 | Example 18 |
|---|---|---|---|---|---|---|---|---|---|---|---|
|  | Starch-based paint |  | No. 10 | No. 11 | No. 12 | No. 13 | No. 14 | No. 15 | No. 16 | No. 17 | No. 18 |
| Amounts added | Resin component | Starch-based resin composition No. 5 Solid content 25% | 400 (100) |  |  |  |  |  |  |  |  |
|  |  | Starch-based resin composition No. 6 Solid content 25% |  | 400 (100) |  |  | 400 (100) | 400 (100) | 400 (100) | 400 (100) | 400 (100) |
|  |  | Starch-based resin composition No. 7 Solid content 25% |  |  | 400 (100) |  |  |  |  |  |  |
|  |  | Starch-based resin composition No. 8 Solid content 25% |  |  |  | 400 (100) |  |  |  |  |  |
| Pigment/coloring component |  | ALPASTE FX7640 (*1) | 46 (23) | 46 (23) | 46 (23) | 46 (23) | 46 (23) | 46 (23) | 46 (23) | 46 (23) | 46 (23) |
|  |  | HICONC BLACK (*2) | 3 (3) | 3 (3) | 3 (3) | 3 (3) | 3 (3) | 3 (3) | 3 (3) | 3 (3) | 3 (3) |
|  |  | SILYSIA 446 (*3) | 1.5 (1.5) | 1.5 (1.5) | 1.5 (1.5) | 1.5 (1.5) | 1.5 (1.5) | 1.5 (1.5) | 1.5 (1.5) | 1.5 (1.5) | 1.5 (1.5) |

TABLE 5-continued

|  |  | Example 10 | Example 11 | Example 12 | Example 13 | Example 14 | Example 15 | Example 16 | Example 17 | Example 18 |
|---|---|---|---|---|---|---|---|---|---|---|
| Wax | HIFLAT F-713 (*4) |  |  |  |  | 2 (2) | 2 (2) | 2 (2) |  | 2 (2) |
|  | TFW-3000F (*5) |  |  |  |  |  |  |  | 15 (2) |  |
| Additive | Indust. nitrocellulose (*6) BNC-HIG-2 |  |  |  |  |  | 75 (15) | 150 (30) | 150 (30) |  |
|  | CAB551-0.2 (*7) |  |  |  |  |  |  |  |  | 150 (30) |
| Solvent | Methyl ethyl ketone | 59.5 | 59.5 | 59.5 | 59.5 | 65.5 | 50.5 | 35.5 | 22.5 | 35.5 |
| 25% Paint |  | 510 (127.5) | 510 (127.5) | 510 (127.5) | 510 (127.5) | 518 (129.5) | 578 (144.5) | 638 (159.5) | 638 (159.5) | 638 (159.5) |

Values in parentheses represent solid contents.

(*1) ALPASTE-7640NS: Aluminum paste by Toyo Aluminium, KK.
(*2) HICONC BLACK: Coloring agent for solvent-type paints, by Yokohama Chemicals Co., Ltd.
(*3) SILYSIA 446: Hydrous amorphous silicon dioxide (delustering agent) by Fuji Silysia Chemical, Ltd.
(*4) HIFLAT F-713: Mineral turpentine suspension of polyethylene wax, by Gifu Shellac Co., Ltd.
(*5) TFW-3000F: Fine powdered fluorine wax by Seishin Enterprise Co., Ltd.
(*6) Industrial nitrocellulose BNC-HIG-2: Propanol-wetted nitrocellulose dissolved in ethyl acetate, by Bergerac, France
(*7) CAB551-0.2: Cellulose acetate butyrate dissolved in ethyl acetate, by Eastman Chemical Products

COMPARATIVE EXAMPLE 1

Production Example for Starch-Based Paint No. 19

After combining 260 parts of the starch-based resin No. 9 solution obtained in Comparative Production Example 5 (65 parts solid portion), 35 parts of TAKENATE D-170HN (*8) (35 parts solid portion), 46 parts of ALPASTE FX-7640NS (*1) (23 parts solid portion), 3 parts of HICONC BLACK (*2), 1.5 parts of SILYSIA 446 (*3) (1.5 parts solid portion), 0.01 part of dibutyltin laurate (0.01 part solid portion) and 164.5 parts of methyl ethyl ketone, the mixture was thoroughly blended with a stirrer to obtain starch-based paint No. 19 with a solid portion of 25%.

(*8) TAKENATE D-170HN: Hexamethylene diisocyanate isocyanurate compound by Takeda Pharmaceutical Co., Ltd.

COMPARATIVE EXAMPLES 2-6

Production Example for Starch-Based paints No. 20-No. 24

Starch-based paints No. 20-No. 24 were obtained in the same manner as Comparative Example 1, except that the compositions were as listed in Table 6.

TABLE 6

|  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
|  |  | Starch-based paint | No. 19 | No. 20 | No. 21 | No. 22 | No. 23 | No. 24 |
| Amounts added | Resin component | Starch-based resin composition No. 9 Solid content 25% | 260 (65) |  |  |  |  |  |
|  |  | Starch-based resin composition No. 10 Solid content 25% |  | 400 (100) |  |  |  |  |
|  |  | Starch-based resin composition No. 11 Solid content 25% |  |  | 400 (100) |  |  |  |
|  |  | Starch-based resin composition No. 12 Solid content 25% |  |  |  | 400 (100) |  |  |
|  |  | Starch-based resin composition No. 13 Solid content 25% |  |  |  |  | 400 (100) |  |
|  |  | Starch-based resin composition No. 14 Solid content 25% |  |  |  |  |  | 400 (100) |
|  |  | TAKENATE D-170HN (*8) | 35 (35) |  |  |  |  |  |
| Pigment/ coloring component | ALPASTE FX7640 (*1) |  | 46 (23) | 46 (23) | 46 (23) | 46 (23) | 46 (23) | 46 (23) |
|  | HICONC BLACK (*2) |  | 3 (3) | 3 (3) | 3 (3) | 3 (3) | 3 (3) | 3 (3) |

TABLE 6-continued

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
|  | SILYSIA 446 (*3) | 1.5 (1.5) | 1.5 (1.5) | 1.5 (1.5) | 1.5 (1.5) | 1.5 (1.5) | 1.5 (1.5) |
| Wax | HIFLAT F-713 (*4) |  |  |  |  |  |  |
|  | TFW-3000F (*5) |  |  |  |  |  |  |
| Additive | Industrial cellulose (*6) |  |  |  |  |  |  |
|  | BNC-HIG-2 |  |  |  |  |  |  |
|  | CAB551-0.2 (*7) |  |  |  |  |  |  |
| Catalyst | Dibutyltin laurate | 0.01 (0.01) |  |  |  |  |  |
| Solvent | Methyl ethyl ketone | 164.5 | 59.5 | 59.5 | 59.5 | 59.5 | 59.5 |
|  | 25% Paint | 510 (127.5) | 510 (127.5) | 510 (127.5) | 510 (127.5) | 510 (127.5) | 510 (127.5) |

Values in parentheses represent solid contents.

Fabrication of Test Sheet

The starch-based paints No. 1-No. 18 obtained in Examples 1-18 and the starch-based paints No. 19-No. 24 obtained in Comparative Examples 1-6 were used for spray coating of a Noryl SE1-701 sheet (modified polyphenylene ether by Japan GE Plastics) to a dry film thickness of 8 μm. Next, an electric hot air drier was used for forced drying at 60° C. for 30 minutes, followed by drying for 7 days at room temperature (20° C.) to obtain test sheets No. 1-No. 24.

These test sheets No. 1-No. 24 were subjected to testing under the conditions for the test method described below. The results for the examples are shown in Tables 7 and 8, and the results for the comparative examples are shown in Table 9.

TABLE 7

|  |  | Example 1 | Example 2 | Example 3 | Example 4 | Example 5 | Example 6 | Example 7 | Example 8 | Example 9 |
|---|---|---|---|---|---|---|---|---|---|---|
|  | Starch-based paint | No. 1 | No. 2 | No. 3 | No. 4 | No. 5 | No. 6 | No. 7 | No. 8 | No. 9 |
| Coating film performance | Storage stability | G | G | G | G | G | G | G | G | G |
|  | Drying property | G | G | G | G | G | VG | VG | VG | VG |
|  | Finished appearances | G | G | G | G | G | G | G | G | G |
|  | Pencil hardness | H | H | H | H | H | H | H | H | H |
|  | Mar resistance | G | G | G | G | VG | VG | VG | VG | VG |
|  | Adhesion | G | G | G | G | G | G | G | G | G |
|  | Alkali resistance | G | G | G | G | G | G | G | G | G |
|  | Solvent resistance | G | G | G | G | G | VG | VG | VG | VG |
|  | Weather resistance | G | G | G | G | G | G | G | G | G |

TABLE 8

|  |  | Example 10 | Example 11 | Example 12 | Example 13 | Example 14 | Example 15 | Example 16 | Example 17 | Example 18 |
|---|---|---|---|---|---|---|---|---|---|---|
|  | Starch-based paint | No. 10 | No. 11 | No. 12 | No. 13 | No. 14 | No. 15 | No. 16 | No. 17 | No. 18 |
| Coating film Performance | Storage stability | G | G | G | G | G | G | G | G | G |
|  | Drying property | G | G | G | G | G | VG | VG | VG | VG |
|  | Finished appearances | G | G | G | G | G | G | G | G | G |
|  | Pencil hardness | H | H | H | H | H | H | H | H | H |
|  | Mar resistance | G | G | G | G | VG | VG | VG | VG | VG |
|  | Adhesion | G | VG | G | VG | VG | VG | VG | VG | VG |
|  | Alkali resistance | G | G | G | G | G | G | G | G | G |
|  | Solvent resistance | G | G | G | G | G | VG | VG | VG | VG |
|  | Weather resistance | G | G | G | G | G | G | G | G | G |

TABLE 9

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
|  | Starch-based paint | No. 19 | No. 20 | No. 21 | No. 22 | No. 23 | No. 24 |
| Coating film performance | Storage stability | P | F | F | F | P | P |
|  | Drying property | P | F | F | F | F | F |
|  | Finished appearances | G | P | F | F | P | P |
|  | Pencil hardness | H | H | H | H | H | H |
|  | Mar resistance | G | P | F | F | F | F |
|  | Adhesion | F | G | F | G | G | F |
|  | Alkali resistance | G | F | G | G | G | F |

TABLE 9-continued

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Solvent resistance | G | F | F | F | F | F |
| Weather resistance | G | G | G | G | G | G |

Test Methods

Storage Stability

Each starch-based paint was stored in a 1 L sealed glass container, and the condition after storage at 30° C. for 24 hours was evaluated as follows.

Good (G): No paint gelling or phase separation.

Fair (F): At least some paint gelling or phase separation.

Poor (P): Notable paint gelling or phase separation. Drying property

The paint was spray coated onto a Noryl SE1-701 sheet (modified polyphenylene ether by Japan GE Plastics) to a dry film thickness of 8 μm and an electric hot air drier was used for forced drying at 60° C. for 30 minutes, after which the coated sheet was immediately cooled to room temperature and the drying property of the surface based on touch was evaluated as follows.

Very good (VG): Coating film hard and smooth, with no imprint left after pressing with the fingernail.

Good (G): Coating film resilient but no imprint left after pressing with the fingernail.

Fair (F): Coating film resilient and imprint left after pressing with the fingernail.

Poor (P): Adhesive touch to coating film, imprint left after pressing with the fingernail, and fingerprint remained after pressing with pad of the finger.

Finished appearance

The outer appearance of the coated surface of each test sheet was visually examined and evaluated as follows.

Good (G): Satisfactory finished appearance.

Fair (F): Reduction in finished appearance as demonstrated by swelling, loss of luster and flaking.

Poor (P): Notable reduction in finished appearance as demonstrated by swelling, loss of luster and flaking.

Pencil Hardness

Following the procedure specified by JIS K5600-5-4 (1999), the core of a pencil was placed against a test coated sheet surface at an angle of about 45°, and moved forward approximately 10 mm at a uniform speed while firmly pressing it against the test coated sheet surface without breaking the core. This procedure was repeated 5 times at different locations, and the hardness number of the pencil with the greatest hardness that did not tear the coating film was recorded as the pencil hardness.

Mar Resistance

After pressing a purchased name card against the coating film and rubbing 20 passes, the degree of damage was visually examined and judged as follows.

Very good (VG): Absolutely no damage.

Good (G): Virtually no damage, or not visible beyond a distance of 5 cm.

Fair (F): Light scuff damage.

Poor (P): Severe scuff damage.

Adhesion

Following the procedure specified by JIS K5600-5-6 (1990), a 100-square grid at 1 mm×1 mm was formed in the coating film and adhesive tape was attached to the surface, and after abruptly peeling it off, the number of squares of the coating film remaining on the coated surface was evaluated.

Very good (VG): Number of remaining squares/total number of squares=100/100

Good (G): Number of remaining squares/total number of squares=99/100

Fair (F): Number of remaining squares/total number of squares=90-98/100

Poor (P): Number of remaining squares/total number of squares=89/100

Alkali Resistance

After dropwise addition of 0.5 mL of a 1% sodium hydroxide aqueous solution onto the coating film surface of a test sheet, it was allowed to stand for 24 hours in an atmosphere at 20° C., 65% RH, and then the coated surface was wiped with gauze and its outer appearance visually examined and evaluated as follows.

Good (G): Absolutely no abnormalities on the coating film surface.

Fair (F): Coloration (whitening) observed on the coating film surface.

Poor (P): Notable coloration (whitening) observed on the coating film surface.

Solvent Resistance

Two sheets of filter paper were placed on the coating film of the test sheet, and the sheets were wetted by dropwise addition of both 78% ethanol and 2% formalin using a dropper. The dropwise addition with the dropper was carried out 5 times during the period of an hour, and then after two hours the filter paper was removed and the surface was observed and evaluated as follows.

Very good (VG): Absolutely no abnormalities such as blistering or peeling.

Good (G): Virtually no abnormalities such as blistering or peeling, or not of a problematic level.

Fair (F): Visually observable abnormalities such as blistering or peeling.

Poor (P): Dissolution of coating film.

Weather Resistance

The luster of each multilayer coating was measured using a carbon arc lamp-type accelerated weather resistance testing sunshine weathermeter according to JIS H8602 5.12(1992) (water spraying time: 12 minutes, black panel temperature: 60° C.), and the time necessary for the gloss retention to fall below 80% with respect to the gloss before the exposure test was measured.

Very good (VG): Over 300 hours necessary for gloss retention to fall below 80%.

Good (G): Between 200 and 300 hours necessary for gloss retention to fall below 80%.

Fair (F): Between 100 and 200 hours necessary for gloss retention to fall below 80%.

Poor (P): Less than 100 hours necessary for gloss retention to fall below 80%.

The present invention provides a coating composition with excellent storage stability, and it is industrially useful because the composition can yield coating films with excellent drying property, finished appearances, pencil hardness, mar resistance, adhesion, alkali resistance, solvent resistance and weather resistance.

What we claim is:

1. A starch-based coating composition comprising
a naturally derived resin,
and
a resin composition obtained by reacting
   (A) a starch and/or a starch that has been esterified, etherified, oxidized, acid treated or dextrinated or modified by comprising one or more groups selected from the group consisting of aliphatic saturated hydrocarbon groups, aliphatic unsaturated hydrocarbon groups, and aromatic hydrocarbon groups, which are bonded by ester bonds and/or ether bonds to the starch or to a decomposition product of a starch that has been processed by a low molecularization treatment with an enzyme, acid or oxidizing agent,
   with
   (B) a compound containing an isocyanate group obtained by reacting
      a polyisocyanate compound (b1)
      and
      a polyhydric alcohol (b2).

2. A starch-based coating composition comprising
a naturally derived resin,
and
a resin composition obtained by reacting
   (A) a starch and/or a starch that has been esterified, etherified, oxidized, acid treated or dextrinated or modified by comprising one or more groups selected from the group consisting of aliphatic saturated hydrocarbon groups, aliphatic unsaturated hydrocarbon groups, and aromatic hydrocarbon groups, which are bonded by ester bonds and/or ether bonds to the starch or to a decomposition product of a starch that has been processed by a low molecularization treatment with an enzyme, acid or oxidizing agent,
   with
   (B) a compound containing an isocyanate group obtained by reacting
      a polyisocyanate compound (b1)
      and
      a polyhydric alcohol (b2),
   and with
   (C) a vinyl copolymer resin obtained by radical polymerization of a mixture comprising
      1-90 mass % of an aromatic radical polymerizing unsaturated monomer,
      1-50 mass % of a hydroxyl-containing radical polymerizing unsaturated monomer,
      and
      0-98 mass % of another radical polymerizing unsaturated monomer, with respect to the total weight of (C) the mixture radical polymerizing unsaturated monomers.

3. A starch-based coating composition according to claim 1, wherein the polyhydric alcohol (b2) is at least one selected from the group consisting of alkylenediols (b21), trivalent or greater alkylene polyols (b22), ether polyols (b23) and polyester polyols (b24).

4. A starch-based coating composition according to claim 1, wherein the starch-based coating composition is dissolved or dispersed in an organic solvent-based medium.

5. A starch-based coating composition according to claim 1, wherein the naturally derived resin is a nitrocellulose and/or cellulose acetate butyrate.

6. A starch-based coating composition comprising
a wax
and
a resin composition obtained by reacting
   (A) a starch and/or a starch that has been esterified, etherified, oxidized, acid treated or dextrinated or modified by comprising one or more groups selected from the group consisting of aliphatic saturated hydrocarbon groups, aliphatic unsaturated hydrocarbon groups, and aromatic hydrocarbon groups, which are bonded by ester bonds and/or ether bonds to the starch or to a decomposition product of a starch that has been processed by a low molecularization treatment with an enzyme, acid or oxidizing agent,
   with
   (B) a compound containing an isocyanate group obtained by reacting
      a polyisocyanate compound (b1)
      and
      a polyhydric alcohol (b2).

7. A coated article which has been coated with a starch-based coating composition according to claim 1.

8. A starch-based coating composition according to claim 2, wherein the polyhydric alcohol (b2) is at least one selected from the group consisting of alkylenediols (b21), trivalent or greater alkylene polyols (b22), ether polyols (b23) and polyester polyols (b24).

9. A starch-based coating composition according to claim 2, wherein the starch-based coating composition is dissolved or dispersed in an organic solvent-based medium.

10. A starch-based coating composition according to claim 2, wherein the naturally derived resin is a nitrocellulose and/or cellulose acetate butyrate.

11. A starch-based coating composition according to claim 1, which further comprises a wax.

12. A starch-based coating composition according to claim 2, which further comprises a wax.

13. A coated article which has been coated with a starch-based coating composition according to claim 2.

14. A starch-based coating composition according to claim 6, wherein the resin composition is obtained by further reacting (A) and (B) with (C) a vinyl copolymer resin obtained by radical polymerization of a mixture comprising
   1-90 mass % of an aromatic radical polymerizing unsaturated monomer,
   1-50 mass % of a hydroxyl-containing radical polymerizing unsaturated monomer,
   and
   0-98 mass % of another radical polymerizing unsaturated monomer, with respect to the total weight of (C) the mixture radical polymerizing unsaturated monomers.

15. A starch-based coating composition according to claim 6, wherein the polyhydric alcohol (b2) is at least one selected from the group consisting of alkylenediols (b21), trivalent or greater alkylene polyols (b22), ether polyols (b23) and polyester polyols (b24).

16. A starch-based coating composition according to claim 6, wherein the starch-based coating composition is dissolved or dispersed in an organic solvent-based medium.

17. A coated article which has been coated with a starch-based coating composition according to claim 6.

18. A starch-based coating composition according to claim 1, wherein (A) is an unmodified grain starch, corn starch, high amylose starch, wheat starch, rice starch, potato starch, or tapioca starch, or an esterified, etherified, oxidized, acid treated or dextrinated starch compound thereof, or a mixture thereof.

19. A starch-based coating composition according to claim 2, wherein (A) is an unmodified grain starch, corn starch, high amylose starch, wheat starch, rice starch, potato starch, or tapioca starch, or an esterified, etherified, oxidized, acid treated or dextrinated starch compound thereof, or a mixture thereof.

20. A starch-based coating composition according to claim 6, wherein (A) is an unmodified grain starch, corn starch, high amylose starch, wheat starch, rice starch, potato starch, or tapioca starch, or an esterified, etherified, oxidized, acid treated or dextrinated starch compound thereof, or a mixture thereof.

\* \* \* \* \*